United States Patent [19]
Geven

[11] Patent Number: 4,631,462
[45] Date of Patent: Dec. 23, 1986

[54] SYSTEM FOR CONTROLLING THE SPEED OF AN ELECTRIC MOTOR

[75] Inventor: Willem J. A. Geven, Eindhoven, Netherlands

[73] Assignee: U.S. Philips Corporation, New York, N.Y.

[21] Appl. No.: 825,837

[22] Filed: Feb. 4, 1986

[30] Foreign Application Priority Data

Sep. 11, 1985 [NL] Netherlands .......................... 8502479

[51] Int. Cl.⁴ ............................................. G05B 19/28
[52] U.S. Cl. .................................... 318/318; 318/327
[58] Field of Search ............... 318/318, 606, 607, 608, 318/327, 326, 603

[56] References Cited

U.S. PATENT DOCUMENTS 3,950,682 4/1976 Dohanich, Jr. ................ 318/318 X
4,376,914 3/1983 Kimura ............................... 318/603
4,562,394 12/1985 Itoh ..................................... 318/608

Primary Examiner—B. Dobeck
Attorney, Agent, or Firm—Robert T. Mayer; Bernard Franzblau

[57] ABSTRACT

A system for controlling the speed of an electric motor (12) comprises two counters (1 and 2) which receive counting pulses from an oscillator (5) and control pulses from a tachogenerator (11). The first counter (1) is reset by a tacho-pulse and counts to a predetermined maximum value. The counting direction of the second counter (2) is reversed both when a tacho-pulse appears and when the predetermined fixed value is reached by the first counter (1). A control signal for the motor is obtained by comparing the count of the second counter (2) with a reference value (R) by means of a comparator (14) to derive an on-off signal.

10 Claims, 5 Drawing Figures

SYSTEM FOR CONTROLLING THE SPEED OF AN ELECTRIC MOTOR

The invention relates to a system for controlling the speed of an electric motor which is controlled by a control signal via an energising circuit, comprising
an oscillator which supplies a first pulse train whose frequency depends on the desired speed,
a first counter whose clock-pulse input is connected to the oscillator output and which counts up to a predetermined value and stops counting when said value is reached,
a second counter whose clock-pulse input is connected to the oscillator output and which starts counting as soon as the first counter supplies a signal when said predetermined value is reached,
means for producing a second pulse train whose frequency depends on the motor speed, which second pulse train is applied to the first counter to re-start said counter when a pulse appears so that it will count from a specific initial count up to said predetermined value, and which pulse train is applied to the second counter to stop the counting process in said second counter when a pulse appears, and
decoding means to which the output signals of the second counter are applied to generate a control signal for the energising circuit.

Such a system is described in British Patent Specification 1,366,971. In fact this known system measures the entire interval between the successive pulses of the second pulse train, the tachometer-pulse train, by allowing the first counter to count up to a fixed value and subsequently starting the second counter, which then counts for the remainder of the interval. The count reached by the second counter is subsequently compared with the count of the first counter. If the count of the second counter is too low or too high a corresponding signal is applied to the motor energising circuit. In this known system the motor energising circuit is required to generate a motor control signal which is based on the signal from the decoding means, by means of which the count of the second counter is evaluated.

It is an object of the invention to provide a system of this type such that the output signal of the decoding means can be used directly as the motor control signal.

Further, the known circuit is comparatively insensitive to slight variations in motor speed. The decoding means do not respond until the count of the second counter differs at least one bit from the count of the first counter, which is used for this comparison.

Therefore, it is another object of the invention to obtain a steep control characteristic in such a way that the system also responds rapidly to small deviations.

According to the invention, in order to achieve these goals, a system of the type defined in the opening paragraph is characterized in that the second counter is a bidirectional counter which counts in one direction in the said interval between the instant at which the first counter reaches the predetermined value and the occurrence of a pulse in the second pulse train and which counts in the other direction in the intermediate intervals, and in that the decoding means are constructed as a comparator to which a reference value is applied in addition to the output signals of the second counter and which supplies a signal of a first level if the reference value exceeds the count of the second counter and a signal of a second level if the reference value is smaller than the count of the second counter.

Embodiments of the invention will now be described in more detail, by way of example, with reference to the accompanying drawings.

Figure 1:
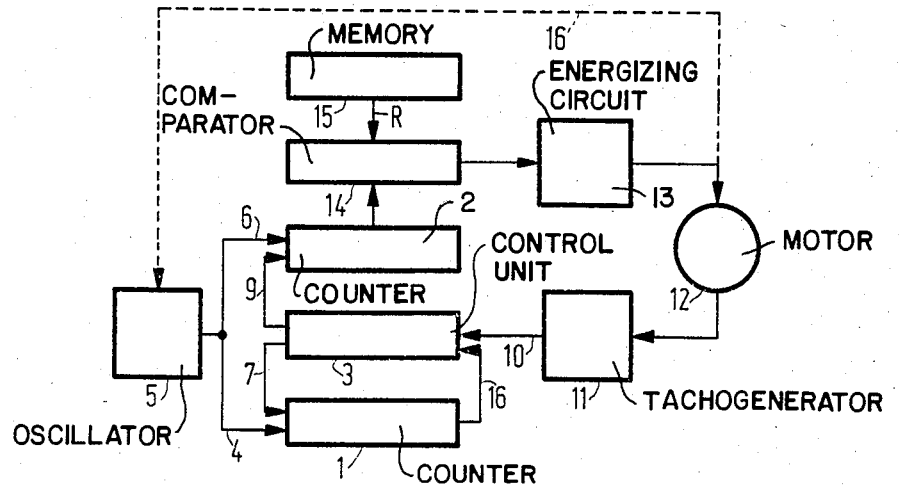
FIG. 1 is a block diagram of the system in accordance with the invention.

FIG. 1 shows a system embodying the invention. The system comprises a counter 1 which receives clock pulses from an oscillator 5 via a line 4. The frequency of these clock pulses governs the nominal speed of the motor 12. Further, it comprises a counter 2 which also receives clock pulses from the oscillator 5 via a line 6.

The counter 1 counts up to a predetermined count and when this count is reached it supplies a signal to a control unit 3 via a line 16. In response thereto the control unit supplies a signal to the counter 1 via a line 7 to stop and, when necessary, reset this counter, and it also supplies a signal to the counter 2 via a line 9 to change the counting direction of this counter.

The control unit 3 further receives a signal from a tachogenerator 11 via a line 10, which signal has a frequency which is proportional to the speed of the motor 12. Every time that an edge occurs in the tachogenerator signal the control unit 3 supplies a signal to the counter 1 to start a new counting cycle and a signal to the counter 2 to reverse the counting direction.

In a comparator 14, the instantaneous count of the counter 2 is continuously compared with a reference value (R) stored in a register or memory 15. If the reference value exceeds the count, the comparator supplies a signal of a first level and if the reference value is smaller than the count the comparator supplies a signal of a second level. This output signal of the comparator is applied to the energizing circuit 13, which in its turn supplies the motor control signal to the motor 12.

Hereinafter the operation of the arrangement will be described with reference to the diagrams in FIGS. 2, 3 and 4.

Figure 2:
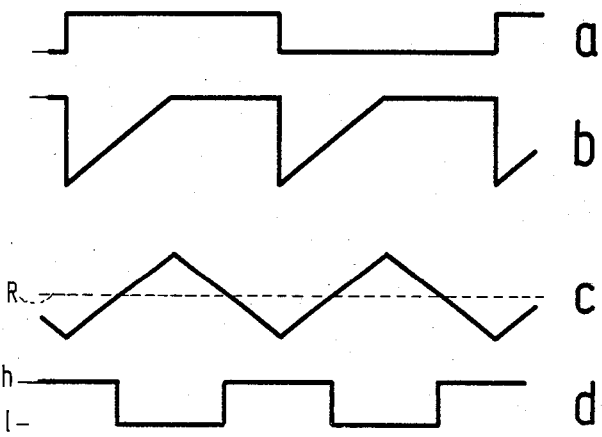
FIG. 2 shows signal waveforms and curves to explain the operation of the system shown in FIG. 1 in the situation in which the motor speed is within the control range.

FIG. 2 serves to illustrate the operation of the circuit in the case where the motor speed is within the control range.

At a the signal from the tachometer 11 is shown, whose frequency is proportional to the speed of the motor 12. At b the variation of the count of the counter is represented schematically. At each edge in the tachometer signal the counter 1 is started from a fixed initial value and counts until a predetermined final value is reached. When this final value is reached the counting process is stopped. The counter 2 is also started to count in one direction at every edge of the tachometer signal, as is illustrated at c in FIG. 2. As soon as the counter 1 has reached its predetermined final count the control unit 3 reverses the counting direction of the counter 2 and the counter 2 counts in the other direction until the next edge in the tachometer signal occurs. When the final count is reached the counter 1 may remain at this count to be reset at the next edge of the tachometer signal or it may be reset directly when its predetermined final count is reached.

The broken line (R) in FIG. 2c schematically represents the reference value stored in the register 5. As is shown in FIG. 2d the comparator 14 supplies a squarewave signal resulting from the comparison between this reference value and the count of the counter 2, which squarewave signal may be used directly for controlling the motor. The motor is energized during the positive or high portions (h) of this squarewave signal and is not energized during the negative or low portion (L) of this squarewave signal.

If the speed of the motor increases the distance between the edges of the tachometer signal will decrease. Since the interval in which the counter 2 counts up remains the same the interval in which the counter 2 counts down becomes smaller, with the result that, seen in FIG. 2, the count of the counter 2 increases gradually relative to the reference value. A consequence of this is that the comparator supplies a squarewave signal whose positive or high portions become increasingly shorter and whose negative or low portions become increasingly longer. As a result of this, the energisation of the motor 12 is reduced to compensate for the increase in speed.

Conversely, if the speed of the motor decreases the distance between the edges of the tachometer signal will increase. Since the interval in which the counter 2 counts up remains the same the interval in which the counter 2 counts down becomes longer with the result that, viewed in FIG. 2c, the count of the counter 2 now gradually decreases relative to the reference value. As a result of this, the comparator supplies a squarewave signal whose positive or high portions become gradually longer. As a result of this, the motor 12 receives a more powerful energisation to compensate for the decrease in speed of the motor 12.

Figure 3:
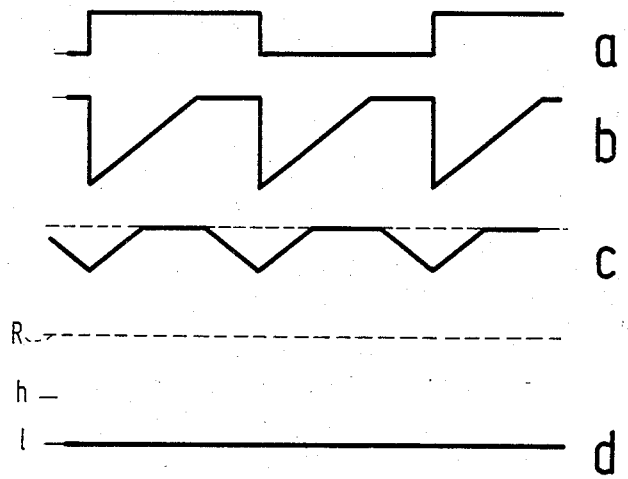
FIG. 3 shows signal waveforms and curves to explain the operation of the system shown in FIG. 1 in the situation in which the motor speed is much too high.

FIG. 3 shows some signal waveforms and curves to illustrate the situation in which the motor speed is too high, which situation occurs for example after a variation of the frequency of the oscillator 5. The tachometer signal is again shown at a and the count of the counter 1 at b. Since the interval in which the counter 1 counts and the counter 2 counts up is longer than the interval in which the counter 1 does not count and the counter 2 counts down, the count of the counter 2 will increase comparatively rapidly until the maximum count of the counter 2 is reached. Now a situation occurs in which, as is shown at line c, the counter 2 counts down and subsequently, together with the counter 1, counts up until the maximum count is reached. However, in all cases the count of the counter 2 remains higher than the reference value in the register 15, so that the comparator 14 will constantly supply a low signal. Therefore, the motor 12 is not energised so that the speed will decrease until the system has come within the control range and operates as described with reference to FIG. 2.

Figure 4:
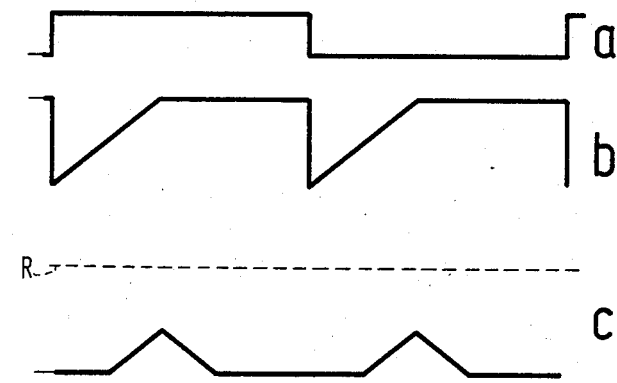
FIG. 4 shows signal waveforms and curves to explain the operation of the system of FIG. 1 in the situation in which the motor speed is much too low.

FIG. 4 shows some signal waveforms and curves illustrating the situation in which the motor speed is too low, which situation occurs for example after a variation of the frequency of the oscillator 5. Again the tachometer signal is represented at a and the count of the counter 1 at b. Since the interval in which the counter 1 counts and the counter 2 counts up is shorter than the interval in which the counter 1 does not count and the counter 2 counts down, the count of the counter 2 will decrease comparatively rapidly until the minimum count of the counter 2 is reached. Then a situation is obtained in which, as is illustrated at line c, the counter 2 each time counts up together with the counter 1 and subsequently counts down until the minimum count is reached again. However, the count of the counter 2 remains below the reference value in all cases so that now the comparator 14 constantly supplies a high signal. Therefore, the motor 12 is constantly energised so that the speed increases until the system has come within the control range and operates as described with reference to FIG. 2.

Figure 5:
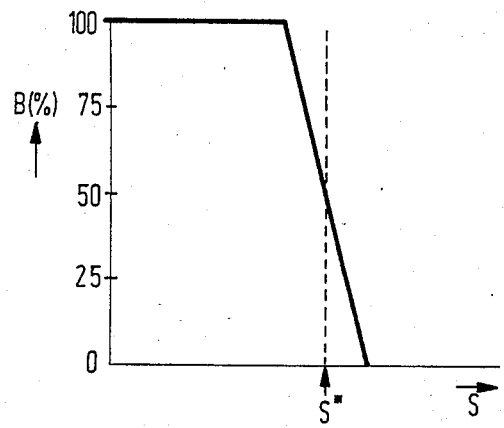
FIG. 5 shows the control characteristic of the system in accordance with the invention.

FIG. 5 shows the control characteristic of the system in accordance with the invention. The speed is plotted along the horizontal axis and the pulse width (B) of the comparator output signal along the vertical axis. If the speed is too low the pulse width is 100%. In other words the motor is energised continuously. If the speed is too high the pulse width of the comparator output signal is 0%, in other words the motor is not energised. In the control range the pulse width varies depending on speed variations relative to the desired speed S in a manner as described with reference to FIG. 2. It will be evident that even a very small deviation of the speed will lead to a gradual increase or decrease of the count of the counter 2 after one or more counting cycles, to which the comparator responds by varying the on/off ratio of the motor control signal to compensate for these variations.

Suitably, the predetermined value up to which the counter 1 counts is selected in such a way that this value is reached at least approximately halfway between two edges in the tachometer signal. In that case the intervals in which the counter 2 counts up and counts down are equally long and the counter 2 will not reach one of its limit values. Also if another choice is made for said predetermined values and the reference value in the register 15 is adapted thereto the system will operate in the manner described, as will be evident to those skilled in the art.

Further it will be evident from the foregoing that the output signal of the comparator can be used directly for controlling the motor 12. This means that the energising circuit 13 need only comprise an amplifier circuit which is capable of delivering enough energy to energise the motor 12. The waveform of the input signal of the energising circuit 13 is identical to the waveform of its output signal. If the comparator 14 itself is capable of delivering enough power, the energising circuit 13 may be dispensed with and the output of the comparator 14 may be coupled directly to the motor 12.

A broken line 16 in FIG. 1 represents a possible connection between the input terminal of the motor 12 and the clock pulse generator 5. Depending on the practical construction of the circuit it is possible that the amplitude of the output signal of the energising circuit 13 or the comparator 14 varies, for example as a result of supply-voltage variations. Such amplitude variations directly influence the speed of the motor 12. In order to eliminate such variations the control signal for the motor 12 (if necessary after rectification) is fed back to the clock-pulse generator 5. The clock-pulse generator 5 may be of a known voltage-controlled type and will respond to the (rectified) control signal from the energising means 13 or the comparator 14 in such a way that an increase in amplitude of the control signal results in a decrease of the clock-pulse frequency of the generator 5, whereas an increase in amplitude of the control signal results in an increase of the clock-pulse frequency so as to compensate for amplitude variations by frequency variations.

The above description should allow those skilled in the art to realise the system in practice, for which reason no further details of the circuit are given. It is to be noted that the present system can be formed almost wholly by means of digital components and is therefore very suitable to be integrated.

The functions of the counter 1, the counter 2, the control unit 3, the comparator 14 and the register 15 can also be realised readily by means of a suitably programmed processor. If the internal clock-pulse generator of the selected processor is stable enough this generator may be used as the generator 5.

What is claimed is:

1. A system for controlling the speed of an electric motor controlled by a control signal via an energising circuit, comprising:
   an oscillator which supplies a first pulse train whose frequency depends on the desired motor speed,
   a first counter having a clock-pulse input connected to the oscillator output and which counts up to a predetermined value and stops counting when said value is reached,
   a second counter having a clock-pulse input connected to the oscillator output and which starts counting as soon as the first counter supplies a signal when said predetermined value is reached,
   means for producing a second pulse train whose frequency depends on the motor speed, said second pulse train being applied to the first counter to re-start said counter when a pulse appears to count from a specific initial count up to said predetermined value and which pulse train is applied to the second counter, and
   decoding means to which the output signals of the second counter are applied to generate a control signal for the energising circuit, characterized in that the second counter comprises a bidirectional counter which counts in one direction in the said interval between the instant at which the first counter reaches the predetermined value and the occurrence of a pulse in the second pulse train and which counts in the other direction in the intermediate intervals and in that the decoding means include a comparator to which a reference value is applied in addition to the output signals of the second counter and which supplies a signal of a first level if the reference value exceeds the count of the second counter and a signal of a second level if the reference value is smaller than the count of the second counter.

2. A system as claimed in claim 1, characterized in that the predetermined value is selected so that the interval in which the first counter counts is at least substantially equal to the following interval which lasts until the appearance of a next pulse in the second pulse train.

3. A system as claimed in claim 2, characterized in that the counting range of the second counter lies between predetermined maximum and minimum values and when these values are reached the counting process in the second counter is stopped until the counting direction of the counting process is reversed, said values being selected in such a way that they are not reached if the instantaneous speed is fully or almost fully in conformity with the desired speed.

4. A system as claimed in claim 1 wherein a signal corresponding to the amplitude of the output signal of the comparator is applied to the oscillator to increase, or reduce the frequency of said oscillator when the amplitude decreases or increases respectively.

5. A system as claimed in claim 1 characterized in that if the comparator can supply enough power for energising the motor the energising circuit comprises a direct connection.

6. A system as claimed in claim 3 characterized in that the reference value is selected halfway between said maximum and minimum values of the second counter.

7. A system as claimed in claim 1 characterized in that the functions of the first counter, the second counter and the comparator are provided by means of a suitably programmed processor.

8. A system as claimed in claim 1 wherein the counting range of the second counter lies between predetermined maximum and minimum values and when said values are reached the counting process in the second counter is stopped until the counting direction of the counting process is reversed, said values being selected so that they are not reached if the instantaneous speed is approximately in conformity with the desired speed.

9. A system as claimed in claim 2 wherein a signal corresponding to the amplitude of the output signal of the comparator is applied to the oscillator to increase or reduce the frequency of said oscillator when the amplitude decreases or increases, respectively.

10. A system as claimed in claim 8 wherein the reference value is selected half way between said maximum and minimum values of the second counter.

* * * * *